United States Patent
Miettinen (10) Patent No.: US 9,449,175 B2
(45) Date of Patent: Sep. 20, 2016

(54) METHOD AND APPARATUS FOR ANALYZING AND DETECTING MALICIOUS SOFTWARE

(75) Inventor: Markus Juhani Miettinen, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 118 days.

(21) Appl. No.: 12/793,235

(22) Filed: Jun. 3, 2010

(65) Prior Publication Data

US 2011/0302654 A1    Dec. 8, 2011

(51) Int. Cl.
*G06F 7/04* (2006.01)
*G06F 21/56* (2013.01)
*G06F 21/55* (2013.01)

(52) U.S. Cl.
CPC ........... *G06F 21/566* (2013.01); *G06F 21/552* (2013.01)

(58) Field of Classification Search
CPC .... G06F 21/56; G06F 21/561; G06F 21/563; G06F 21/564; G06F 21/552; G06F 21/566
USPC .................................. 726/22–25, 6
See application file for complete search history.

(56) References Cited

U.S. PATENT DOCUMENTS

| | | | | | |
|---|---|---|---|---|---|
| 6,560,632 | B1 * | 5/2003 | Chess | ...................... | H04L 29/06 709/201 |
| 7,854,004 | B2 * | 12/2010 | van der Made | ................ | 726/23 |
| 8,505,101 | B1 * | 8/2013 | Lee | .................. | 726/24 |
| 2002/0066024 | A1 * | 5/2002 | Schmall et al. | ............. | 713/200 |
| 2002/0178374 | A1 * | 11/2002 | Swimmer et al. | ............ | 713/200 |
| 2003/0131256 | A1 * | 7/2003 | Ackroyd | ....................... | 713/201 |
| 2006/0161984 | A1 * | 7/2006 | Phillips et al. | .................. | 726/24 |
| 2006/0230289 | A1 * | 10/2006 | Fox et al. | ...................... | 713/188 |
| 2007/0094734 | A1 | 4/2007 | Mangione-Smith et al. | | |
| 2007/0136455 | A1 | 6/2007 | Lee et al. | | |
| 2007/0240117 | A1 | 10/2007 | Wiles et al. | | |
| 2007/0240217 | A1 * | 10/2007 | Tuvell et al. | ................... | 726/24 |
| 2007/0240218 | A1 * | 10/2007 | Tuvell et al. | ................... | 726/24 |
| 2007/0240219 | A1 * | 10/2007 | Tuvell et al. | ................... | 726/24 |
| 2007/0240220 | A1 * | 10/2007 | Tuvell et al. | ................... | 726/24 |
| 2007/0240221 | A1 * | 10/2007 | Tuvell et al. | ................... | 726/24 |
| 2007/0240222 | A1 * | 10/2007 | Tuvell et al. | ................... | 726/24 |
| 2008/0127346 | A1 * | 5/2008 | Oh et al. | ......................... | 726/23 |

(Continued)

FOREIGN PATENT DOCUMENTS

| | | |
|---|---|---|
| CN | 101140611 A | 3/2008 |
| CN | 101493925 A | 7/2009 |
| EP | 1 959 367 A2 | 8/2008 |

OTHER PUBLICATIONS

Pennington et al, Storage-Based Intrusion Detection, ACM, vol. 13, No. 4 article 30, Dec. 2010, pp. 30:2-30:27.*

(Continued)

*Primary Examiner* — Luu Pham
*Assistant Examiner* — Jenise Jackson
(74) *Attorney, Agent, or Firm* — Alston & Bird LLP (57) ABSTRACT

A method for providing analysis and detection of malicious software may include directing a comparison of patterns within sample code to a predetermined set of malicious software patterns, determining whether the sample code is likely to be malicious software based on the comparison, and, in response to a determination that the sample code is likely to be malicious software, determining a malicious software cluster with which the sample code is associated based on the patterns within the sample code. A corresponding computer program product and apparatus are also provided.

14 Claims, 3 Drawing Sheets

(56) References Cited

U.S. PATENT DOCUMENTS

| | | | |
|---|---|---|---|
| 2009/0077665 A1* | 3/2009 | Chang | 726/24 |
| 2009/0187992 A1* | 7/2009 | Poston | 726/24 |
| 2009/0271867 A1* | 10/2009 | Zhang | 726/24 |
| 2010/0115620 A1 | 5/2010 | Alme | |
| 2010/0162400 A1* | 6/2010 | Feeney et al. | 726/24 |
| 2011/0055925 A1* | 3/2011 | Jakobsson | 726/25 |
| 2011/0179484 A1* | 7/2011 | Tuvell et al. | 726/22 |
| 2011/0271341 A1* | 11/2011 | Satish et al. | 726/23 |
| 2011/0283361 A1* | 11/2011 | Perdisci et al. | 726/24 |
| 2015/0026808 A1* | 1/2015 | Perdisci et al. | 726/23 |

OTHER PUBLICATIONS

Treinen, Heuristics for Improved Enterprise Intrusion Detection, University of Denver, Jun. 2009, pp. 1-104.*

Liu, Z., et al.; "The Unknown Computer Viruses Detection Based on Similarity"; IEICE Transactions on Fundamentals of Electronics; Communication and Computer Sciences; vol. E92-A; No. 1; Jan. 2009; pp. 190-196.

International Search Report and Written Opinion for International Application No. PCT/IB2011/051182, mailed Dec. 5, 2011.

Griffin, K., et al.; "*Automatic Generation of String Signatures for Malware Detection;*" Recent Advances in Intrusion Detection: 12$^{th}$ International Symposium (RAID); pp. 101-120; dated Sep. 2009.

Halonen, P., et al.; "*Computer Log Anomaly Detection Using Frequent Episodes;*" IFIP International Federation for Information Processing Conference for Artificial Intelligence Applications and Innovations III, vol. 296; pp. 417-422; dated Apr. 2009.

Extended European Search Report for Application No. 11789333.9; dated Dec. 4, 2013.

Office Action from Chinese Application No. 201180037165.0, dated Nov. 2, 2014.

Office Action from Korean Application No. 2013-7000043, dated Jul. 29, 2014.

Office Action for Chinese Application No. 201180037165.0 dated Jun. 11, 2015.

Office Action from Korean Patent Application No. 2013-7000043 dated Feb. 27, 2015.

Office Action for corresponding Chinese Application No. 201180037165.0 dated Sep. 21, 2015.

Office Action from corresponding Chinese Patent Application No. 201180037165.0 dated Mar. 3, 2016.

* cited by examiner

METHOD AND APPARATUS FOR ANALYZING AND DETECTING MALICIOUS SOFTWARE

TECHNOLOGICAL FIELD

Embodiments of the present invention relate generally to network and device security technology and, more particularly, relate to a method, apparatus and computer program product for providing analysis and detection of malicious software.

BACKGROUND

The modern communications era has brought about a tremendous expansion of wireline and wireless networks. Computer networks, television networks, and telephony networks are experiencing an unprecedented technological expansion, fueled by consumer demand. Networking technologies have addressed related consumer demands, while providing more flexibility and immediacy of information transfer.

Current and future networking technologies continue to facilitate ease of information transfer and convenience to users by expanding the capabilities of electronic devices and by improving network performance. One area in which there is a demand to increase ease of information transfer relates to the delivery of services to a user of an electronic device. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. Alternatively, the network device may respond to commands or request made by the user (e.g., content searching, mapping or routing services, etc.). The services may be provided from a network server or other network device, or even from a mobile terminal such as, for example, a mobile telephone, a mobile navigation system, a mobile computer, a mobile television, a mobile gaming system, etc.

The continuous demand for content and information results in the transfer of large amounts of data, content and information between devices. While much of the material transferred between devices is exactly that which is desired by the corresponding user, malicious software (or malware) can also be transferred among devices. The malware may pose privacy concerns, be disruptive or even be destructive and costly in some situations. Accordingly, it may be desirable to continue to develop improved mechanisms by which protection against malware may be provided.

BRIEF SUMMARY

A method, apparatus and computer program product are therefore provided to enable software to be analyzed for the detection of malicious software. In this regard, for example, some embodiments may provide for the analysis of software based on patterns in code structure of the software. Malicious software may therefore be detected in some cases, based on patterns in the code structure of the software.

In one example embodiment, a method of providing analysis and detection of malicious software is provided. The method may include directing a comparison of patterns within sample code to a predetermined set of malicious software patterns, determining whether the sample code is likely to be malicious software based on the comparison, and, in response to a determination that the sample code is likely to be malicious software, determining a malicious software cluster with which the sample code is associated based on the patterns within the sample code.

In another example embodiment, a computer program product for providing analysis and detection of malicious software is provided. The computer program product includes at least one computer-readable storage medium having computer-executable program code instructions stored therein. The computer-executable program code instructions may include program code instructions for directing a comparison of patterns within sample code to a predetermined set of malicious software patterns, determining whether the sample code is likely to be malicious software based on the comparison, and, in response to a determination that the sample code is likely to be malicious software, determining a malicious software cluster with which the sample code is associated based on the patterns within the sample code.

In another example embodiment, an apparatus for providing analysis and detection of malicious software is provided. The apparatus may include at least one processor and at least one memory including computer program code. The at least one memory and the computer program code may be configured to, with the at least one processor, cause the apparatus to perform at least directing a comparison of patterns within sample code to a predetermined set of malicious software patterns, determining whether the sample code is likely to be malicious software based on the comparison, and, in response to a determination that the sample code is likely to be malicious software, determining a malicious software cluster with which the sample code is associated based on the patterns within the sample code.

Embodiments of the invention may provide a method, apparatus and computer program product for employment in mobile environments or in fixed environments. As a result, for example, mobile terminal and other computing device users may enjoy an improved level of security when accessing network applications or services.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, some embodiments of the present invention may relate to the provision of malicious software detection. In some cases, detection of malware has been based on analysis of properties of the code and/or checking of checksums calculated from the binary code. However, operation of such methods may be complicated in situations where the malware either modifies itself or is released routinely as a new, slightly modified version of other malware. In these cases, any changes in the code may cause the checksums to change and therefore new versions of the malware code may not match with old detection signatures. In some cases, several partial checksums may be employed over the malware code, so that any unmodified parts of the malware code maintain the same checksum. However, changes that are made to the malware code over the full body of the code may complicate successful implementation of these mechanisms as well. Accordingly, in some embodiments, software may be analyzed on the basis of patterns in code structure and malicious software may be detected based on such patterns. Thus, for example, worms, viruses and other malware may be detected to improve the security and stability of platforms that operate on executable code, even when changes have been made to the code. Moreover, embodiments may be applicable to personal computer (PC) programs, mobile terminal programs or executable code for use with any execution platform.

Figure 1:
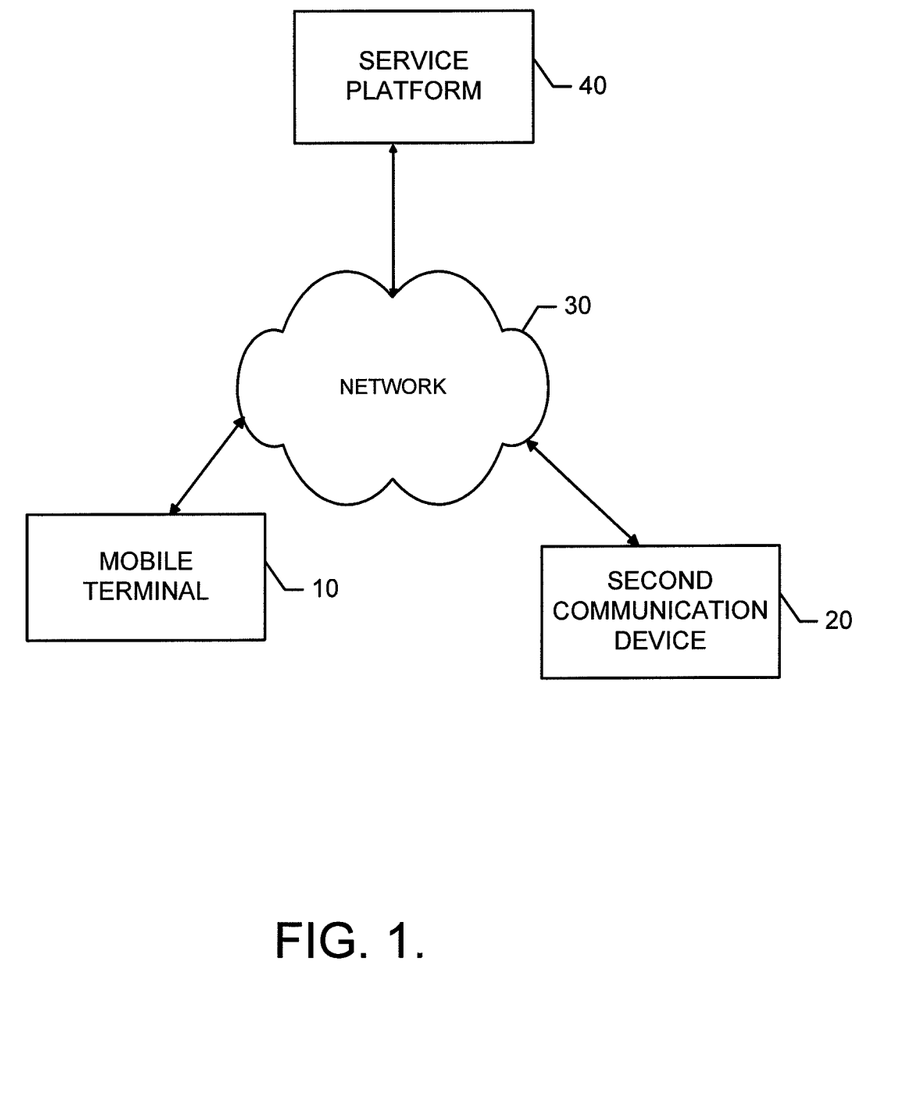
FIG. 1 is a schematic block diagram of a wireless communications system according to an example embodiment of the present invention.

FIG. 1 illustrates a generic system diagram in which a device such as a mobile terminal 10, which may benefit from embodiments of the present invention, is shown in an example communication environment. As shown in FIG. 1, a system in accordance with an example embodiment of the present invention includes a first communication device (e.g., mobile terminal 10) and a second communication device 20 that may each be capable of communication with a network 30. The second communication device 20 is provided as an example to illustrate potential multiplicity with respect to instances of other devices that may be included in the network 30 and that may practice example embodiments. The communications devices of the system may be able to communicate with network devices or with each other via the network 30. In some cases, the network devices with which the communication devices of the system communicate may include a service platform 40. In an example embodiment, the mobile terminal 10 (and/or the second communication device 20) is enabled to communicate with the service platform 40 to provide, request and/or receive information.

While an example embodiment of the mobile terminal 10 may be illustrated and hereinafter described for purposes of example, numerous types of mobile terminals, such as portable digital assistants (PDAs), pagers, mobile televisions, mobile telephones, gaming devices, laptop computers, cameras, camera phones, video recorders, audio/video player, radio, GPS devices, navigation devices, or any combination of the aforementioned, and other types of voice and text communications systems, may readily employ embodiments of the present invention. Furthermore, devices that are not mobile may also readily employ embodiments of the present invention. As such, for example, the second communication device 20 may represent an example of a fixed electronic device that may employ an example embodiment. For example, the second communication device 20 may be a personal computer (PC) or other terminal having a touch display.

In some embodiments, not all systems that employ embodiments of the present invention may comprise all the devices illustrated and/or described herein. For example, while an example embodiment will be described herein in which either a mobile user device (e.g., mobile terminal 10), a fixed user device (e.g., second communication device 20), or a network device (e.g., the service platform 40) may include an apparatus capable of performing example embodiments in connection with communication with the network 30, it should be appreciated that some embodiments may exclude one or multiple ones of the devices or the network 30 altogether and simply be practiced on a single device (e.g., the mobile terminal 10 or the second communication device 20) in a stand alone mode.

In an example embodiment, the network 30 includes a collection of various different nodes, devices or functions that are capable of communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like.

One or more communication terminals such as the mobile terminal 10 and the second communication device 20 may be capable of communication with each other via the network 30 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (e.g., personal computers, server computers or the like) may be coupled to the mobile terminal 10 and the second communication device 20 via the network 30. By directly or indirectly connecting the mobile terminal 10, the second communication device 20 and other devices to the network 30, the mobile terminal 10 and the second communication device 20 may be enabled to communicate with the other devices (or each other), for example, according to numerous communication protocols including Hypertext Transfer Protocol (HTTP) and/or the like, to thereby carry out various communication or other functions of the mobile terminal 10 and the second communication device 20, respectively.

Furthermore, although not shown in FIG. 1, the mobile terminal 10 and the second communication device 20 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 and the second communication device 20 may be enabled to communicate with the network 30 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the service platform 40 may be a device or node such as a server or other processing device. The service platform 40 may have any number of functions or associations with various services. As such, for example, the service platform 40 may be a platform such as a dedicated server (or server bank) associated with a particular information source or service (e.g., a security service), or the service platform 40 may be a backend server associated with one or more other functions or services. As such, the service platform 40 represents a potential host for a plurality of different services or information sources. In some embodiments, the functionality of the service platform 40 is provided by hardware and/or software components configured to operate in accordance with known techniques for the provision of information to users of communication devices. However, at least some of the functionality provided by the service platform 40 is information provided in accordance with example embodiments of the present invention.

Figure 2:
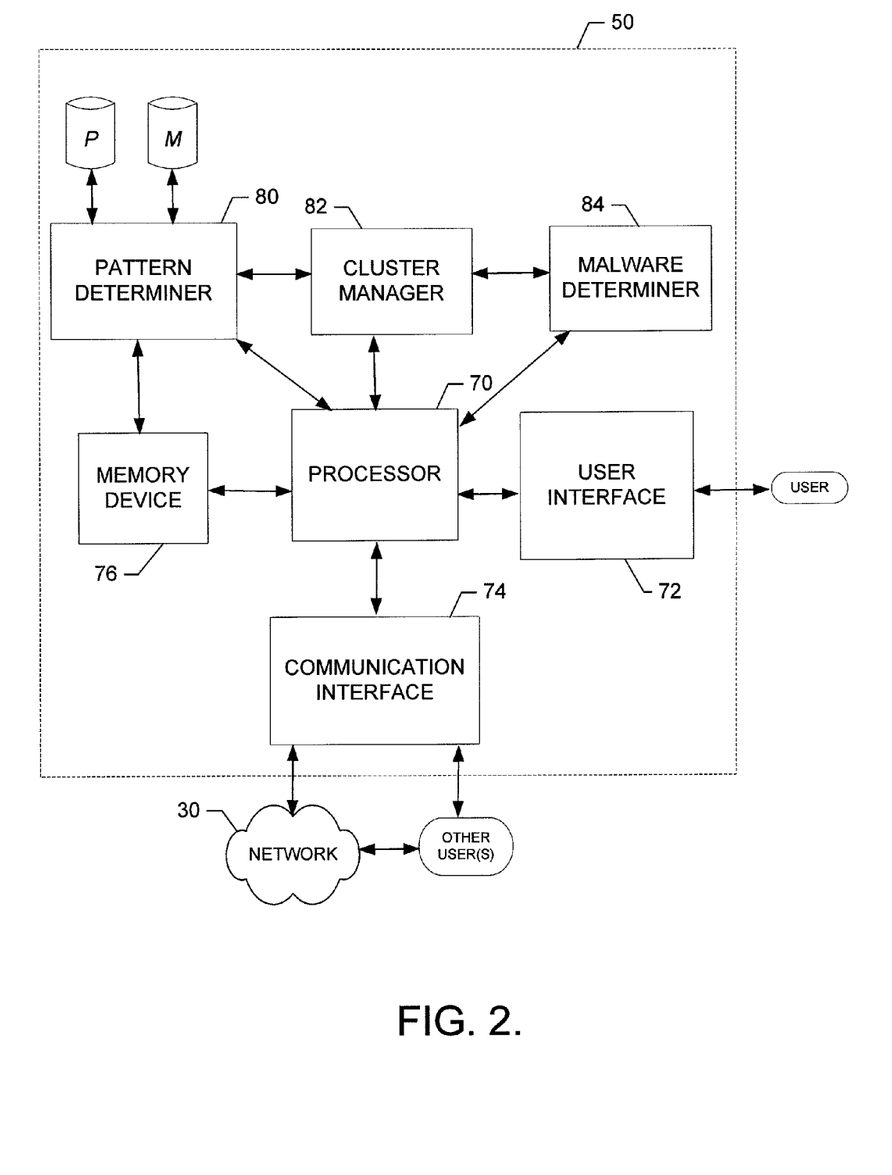
FIG. 2 illustrates a block diagram of an apparatus for providing analysis and detection of malicious software according to an example embodiment of the present invention.

FIG. 2 illustrates a schematic block diagram of an apparatus for providing analysis and detection of malicious software according to an example embodiment of the present invention. An example embodiment of the invention will now be described with reference to FIG. 2, in which certain elements of an apparatus 50 for providing analysis and detection of malicious software are displayed. The apparatus 50 of FIG. 2 may be employed, for example, on the service platform 40, on the mobile terminal 10 and/or on the second communication device 20. However, the apparatus 50 may alternatively be embodied at a variety of other devices, both mobile and fixed (such as, for example, any of the devices listed above). In some cases, embodiments may be employed on either one or a combination of devices. Accordingly, some embodiments of the present invention may be embodied wholly at a single device (e.g., the service platform 40, the mobile terminal 10 or the second communication device 20), by a plurality of devices in a distributed fashion or by devices in a client/server relationship (e.g., the mobile terminal 10 and the service platform 40). Furthermore, it should be noted that the devices or elements described below may not be mandatory and thus some may be omitted in certain embodiments.

Referring now to FIG. 2, an apparatus for providing analysis and detection of malicious software is provided. The apparatus 50 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates or other structures defining memory cells configured to store data (e.g., bits) that may be retrievable by a machine (e.g., a computing device). The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., the mobile terminal 10 or a network device) adapted for employing embodiments of the present invention by further configuration of the processor 70 by instructions for performing the algorithms and/or operations described herein. By executing the instructions or programming provided thereto or associated with the configuration of the processor 70, the processor 70 may cause corresponding functionality to be performed. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the mobile terminal 10 or the second communication device 20), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an exemplary embodiment, the processor 70 may be embodied as, include or otherwise control a pattern determiner 80, a cluster manager 82 and a malware detector 84. As such, in some embodiments, the processor 70 may be said to cause, direct or control the execution or occurrence of the various functions attributed to the pattern determiner 80, the cluster manager 82 and/or the malware detector 84 as described herein. The pattern determiner 80, the cluster manager 82 and the malware detector 84 may each be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the pattern determiner 80, the cluster manager 82 and the malware detector 84, respectively, as described herein. Thus, in examples in which software is employed, a device or circuitry (e.g., the processor 70 in one example) executing the software forms the structure associated with such means.

In an example embodiment, the pattern determiner 80 may generally be configured to determine a set of malware patterns from a plurality of malware samples or from library of known malware examples. The cluster manager 82 may be configured to cluster the set of malware patterns based on commonalities between respective patterns. In effect, the cluster manager 82 may therefore be configured to define clusters or families of malware based on commonalities or similarities in the patterns. The malware detector 84 may be configured to perform comparisons between code to be analyzed and the set of malware patterns to determine whether and/or to what degree malware patterns match or are similar to the code to be analyzed. As such, the malware detector 84 may be configured to detect or determine whether the code to be analyzed is malware based on the comparison. In some embodiments, the malware detector 84 may also be configured to determine to which family of malware the code to be analyzed (in response to such code being determined to be malware) belongs or is most closely related.

The pattern determiner 80 may be configured to determine a set of malware patterns. In an example embodiment, the pattern determiner 80 may be enabled to access a repository or library (e.g., stored in the memory device 76 or some other accessible memory location) storing a robust set of malicious software samples. As such, the pattern determiner 80 may be configured to reference a repository of the executable code and/or metadata of known malware. In some cases, source code of malicious software may be used, if the source code happens to be available.

In an example embodiment, the pattern determiner 80 may be configured to process malware samples by disassembling the executable code to produce a higher-level representation (e.g. assembler code or a higher-level language) of the executable binary. The code may then be divided into sequences so that commands belonging to the same function or subroutine may be assigned to the same sequence. Optionally, other sequencing criteria of the code may also be used. For example, commands belonging to the same conditional construct (e.g. any if-then-else or case-type constructs) or looping construct (for- or while- type constructs) can be assigned to a separate sequence. In some cases, commands that belong to the same "basic block" (e.g., a sequence of commands that always get executed in sequence such that, for example, there are no branches inside a basic block and no jumps outside the basic block) may be assigned to a separate sequence. In an example embodiment, each sequence of code is then preprocessed further to form a record representing the sequence. Each command (instruction, function call or the like) in the sequence may then be processed.

In an example embodiment, the commands may be processed by initially translating a command into a command symbol using a common mapping dictionary. Possible related command parameters that are specific to the instance of analyzed code like, for example, references to memory positions and/or the like, may be discarded. Command parameters that have a fixed global meaning such as, for example, references to processor registers, may be translated into parameter symbols also using the common mapping dictionary. Then, the command symbol may be concatenated with possible parameter symbols. In some embodiments, a number descriptive of the count of parameters for the command can also be concatenated to the symbols. The final concatenated symbol may then be added to the record. Once all commands in a sequence have been translated, the resulting symbol record may be processed by eliminating duplicate symbols in the record. In some cases, the amount of duplicates can be either discarded or concatenated with the symbol (concatenation may be done in a way such that parameter counts possibly contained in the symbol remain clearly distinguishable from the duplicate symbol count). The resulting symbols may be ordered inside the record in lexicographical order. Finally, the processed record may be added to a malware code database M linked with metadata identifying, from which malware sample the record originated. In some embodiments, the original ordering of symbols (e.g., the instructions in the code) may be preserved such that duplicates may not be removed and the record may not be reordered. With symbol sequences that preserve original ordering, frequent episode mining may be applied to extract patterns for which the relative ordering of instructions is relevant. As such, in some embodiments, patterns may take relative ordering of instructions into account.

Once all of the malware samples have been preprocessed and the malware code database M contains data from all desired samples, the common malware code patterns may be determined. Determination of the common malware code patterns may be accomplished by executing a frequent pattern mining algorithm such as, for example, Apriori, on the database M. The algorithm may find symbol combinations in M that occur more frequently together than a user-specified frequency threshold freq_thr. The frequent symbol combinations may therefore represent typical patterns of commands in the corresponding malware samples. The resulting code patterns may then be stored into a malware code pattern database P.

In some embodiments, the resulting code patterns may be filtered based on a selected criteria and a filtered subset of the patterns may then be employed. For example, a user may be enabled to limit the patterns so that only closed frequent patterns or filtered frequent patterns are stored in database P. A frequent pattern p may be said to be closed if no other pattern of which the pattern p is a proper subset, has the same frequency as p. In other words, a pattern may be closed, if it has its own closure with regard to frequency. The frequency of a pattern may be defined as the amount of records in which the pattern p occurs divided by the total number of records in the database. However, in some cases, the definition of frequency of a pattern may omit division by database size, and frequency may be defined as an amount of records in which the pattern p occurs.

In some embodiments, the malware code pattern database P can be refined in alternative ways. For example, after the above described processing, the malware code pattern database P may include all code patterns that frequently occur in malware programs. A situation may arise in which one or more of the patterns identified in the malware code pattern database P happens to be a pattern that is present or even common in regular or benign programs. This issue may be addressed by performing a pattern extraction procedure (e.g., similar to the mechanism described above) on a sample of benign programs as well. The malware code pattern database P can then be filtered by removing patterns of benign programs from the malware code pattern database P. After the filtering, the malware code pattern database P may include a more accurate representation of patterns that are associated with malware code.

In an example embodiment, as indicated above, the cluster manager 82 may be configured to cluster the set of malware patterns based on commonalities or similarities between respective patterns in order to define families of malware. In some embodiments, each malware sample m_k is clustered to a group of malware samples based on the (maximal) set of malware code patterns to which it matches. For example, each sample m_k may be assigned to a malware code cluster represented by c_j={p_1, p_2, . . . , p_n} in a set of malware code patterns p_i in malware code pattern database P.

In some example embodiments, each malware sample m_k may also receive a secondary cluster classification, based on similarity to a pattern set c' that may be similar to the sample's actual pattern set c. For determining a possibly related malware code pattern, the occurrence frequency of c and its proper subsets of size |c|−pdelta in the malware code database M may be calculated. In some embodiments, pdelta may be a user-specified parameter having a value of 1, 2, 3, . . . , or the like. The occurrence frequency of c may be defined to be the number of distinct malware samples having entries in M that match with all p_i in c.

If there is a subset c' of c having an occurrence frequency in M that differs from the occurrence frequency of c by at most fdelta (fdelta being a user-specified parameter that may typically be relatively small in comparison with the occurrence frequencies), then c' may be interpreted to be related to c and m_k receives c' assigned as its secondary cluster.

The malware detector 84 may be configured to utilize the malware code patterns and the corresponding clustering (and perhaps also any optional secondary clustering that may be employed) that has been provided by the pattern determiner 80 and the cluster manager 82, to determine whether a code sample being analyzed is malicious or not. In this regard, for example, the analyzed code sample may be translated into symbol records in similar fashion to the manner in which symbol record processing was described in connection with the pattern determiner 80 above. The code sample may be compared against the malware code patterns in the malware code pattern database P and all patterns p that match to the sample may be determined. In response to a malware code pattern p in the malware code pattern database P matching with the symbol records of the analyzed code sample, the code sample may be deemed to be potentially malicious code. In some cases, a number or degree of matching patterns may be determined and the higher the number of matching patterns, the more likely it may be considered that the code sample is in fact malicious code. As such, for example, the likelihood of any sample code being analyzed being considered to be malicious code may be a function of the amount of similarity between the sample code and known malicious code patterns. However, even though the amount of similarity may sometimes be measured relative to a threshold or percentage, it is not necessary that a greater than fifty percent probability or degree of matching be present for a sample code to be likely to be malicious. Instead, only a very small degree of overall matching could be present in some cases if a reliable single pattern match is found. After the determination regarding whether the code sample is malicious code, the code sample and the corresponding malicious patterns may, in some cases, then be displayed to the user of the system and/or output for further processing.

In an example embodiment, in response to a determination that the code sample is malware, the malware detector 84 may be further configured to determine the malware family to which the code sample belongs or is most closely associated. In some cases, the malware detector 84 may be configured to identify or determine the appropriate cluster with which the analyzed sample code is potentially or most closely related. To accomplish this, the malware detector 84 may compare the patterns of the sample code to the clusters defined by the cluster manager 82 to find a cluster that most closely matches the patterns defined in the sample code. After determining the cluster, the determined cluster and possible other malware samples belonging to the same cluster can be displayed to the user and/or output for further processing.

As can be seen from the description above, some embodiments may provide an automated method for detecting malware that is based on the code structure of the malware. Embodiments may therefore be enabled to detect malware, even though the malware mutates or the malware authors apply changes in instruction ordering in order to circumvent traditional checksumming-based detection techniques. Some embodiments may also present a mechanism by which to automatically determine, to which category or 'malware family' specific malware samples or detection samples belong. Accordingly, security may be improved for all kinds of computer code including, for example, assembler instructions as well as bytecode.

Figure 3:
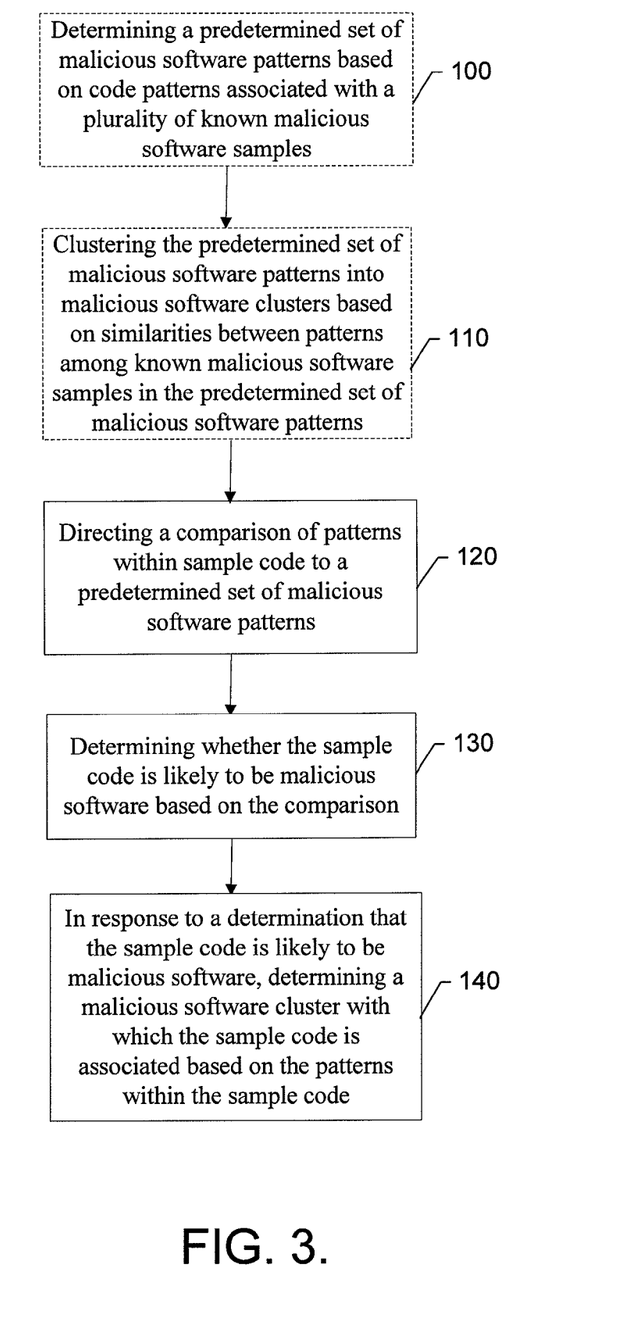
FIG. 3 is a flowchart according to another example method for providing analysis and detection of malicious software according to an example embodiment of the present invention.

FIG. 3 is a flowchart of a method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal or network device and executed by a processor in the user terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 3, may include directing a comparison of patterns within sample code to a predetermined set of malicious software patterns at operation 120 and determining whether the sample code is likely to be malicious software based on the comparison at operation 130. The method may further include, in response to a determination that the sample code is likely to be malicious software, determining a malicious software cluster with which the sample code is associated based on the patterns within the sample code at operation 140.

In some embodiments, certain ones of the operations above may be modified or further amplified as described below. Moreover, in some embodiments additional optional operations may also be included (an example of which is shown in dashed lines in FIG. 3). It should be appreciated that each of the modifications, optional additions or amplifications below may be included with the operations above either alone or in combination with any others among the features described herein. In this regard, for example, the method may further include determining the predetermined set of malicious software patterns based on code patterns associated with a plurality of known malicious software samples at operation 100. Additionally or alternatively, the method may further include clustering the predetermined set of malicious software patterns into malicious software clusters based on similarities between patterns among known malicious software samples in the predetermined set of malicious software patterns at operation 110. The clustering may therefore be performed based on the similarities of the patterns themselves. However, in some embodiments, the clustering of patterns may be based on metadata related to the patterns. Thus, for example, if some malware patterns occur only in samples from one or a few distinct malware families, the clustering may be based on the malware families. Similarly, any other identifying metadata related to the samples in which the patterns occur may be used in clustering the patterns. In an example embodiment, determining the predetermined set of malicious software patterns may include, for the plurality of known malicious software samples, producing a higher-level representation of executable code of a known malicious software sample, dividing the executable code into sequences based on sequencing criteria, processing the sequences to form a symbol record for each sequence, processing the symbol record and adding the symbol record to a repository of malicious software code, determining common patterns between known malicious software samples of the repository based on frequently occurring symbol combinations, and storing the common patterns as the predetermined set of malicious software patterns. In some cases, determining the predetermined set of malicious software patterns may include determining common patterns between known malicious software samples based on frequently occurring symbol combinations, and filtering the common patterns based on patterns of known benign software samples to define the predetermined set of malicious software patterns. In some embodiments, clustering the predetermined set of malicious software patterns may include assigning a plurality of patterns to respective clusters and assigning at least one pattern to a secondary cluster in addition to its corresponding cluster. In an example embodiment, determining whether the sample code is likely to be malicious software may include determining a number of matching patterns between the sample code and the predetermined set of malicious software patterns and determining a likelihood that the sample code is malicious software based on the number. In some embodiments, determining whether the sample code is likely to be malicious software may further include providing an output to a user in response to the sample code likely being malicious software and/or determining the malicious software cluster with which the sample code is associated may further include providing an output to a user indicating the malicious software cluster.

In some cases, the operations (100-140) described above, along with any of the modifications may be implemented in a method that involves facilitating access to at least one interface to allow access to at least one service via at least one network. In such cases, the at least one service may be to perform at least operations 100 to 140.

In an example embodiment, an apparatus for performing the method of FIG. 3 above may comprise a processor (e.g., the processor 70) configured to perform some or each of the operations (100-140) described above. The processor may, for example, be configured to perform the operations (100-140) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-140 may comprise, for example, the processor 70, respective ones of the pattern determiner 80, the cluster manager 82, the malware detector 84, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   directing a comparison of patterns within sample code to a predetermined set of malicious software patterns, wherein determining the predetermined set of malicious software patterns comprises:
      determining common patterns between known malicious software samples based on frequently occurring symbol combinations; and
      filtering the common patterns based on patterns of known benign software samples to define the predetermined set of malicious software patterns;
   determining that the sample code is malicious software based on a number of patterns within the sample code that match patterns within the predetermined set of malicious software patterns; and
   subsequent to the determination that the sample code is malicious software, determining one or more clusters with which the sample code is associated,
   wherein the determination of the one or more clusters with which the sample code is associated with comprises:
      determining a first occurrence frequency, the first occurrence frequency being a number of distinct malicious software samples that match each malware code pattern within the sample code;
      determining a second occurrence frequency, the second occurrence frequency being a number of distinct malicious software samples that match each malware code pattern within a subset of the sample code;
      determining a first malicious software cluster with which the sample code is associated based on the first occurrence frequency,
      wherein the first malicious software cluster is comprised of one or more malicious software samples clustered based on a set of malicious code patterns to which the one or more malicious software samples matches; and
      determining a second malicious software cluster with which the sample code is associated based on the difference between the first occurrence frequency and the second occurrence frequency being less than or equal to a predetermined parameter, wherein the second malicious software cluster is comprised of one or more malicious software samples clustered based on the set of malicious code patterns to which the one or more malicious software samples matches; and
   providing an output, in response to a request comprising the sample code, indicating that the sample code is malicious software.

2. The method of claim 1, further comprising determining the predetermined set of malicious software patterns based on code patterns associated with a plurality of known malicious software samples.

3. The method of claim 2, wherein determining the predetermined set of malicious software patterns comprises, for the plurality of known malicious software samples:
   producing a representation of executable code of a known malicious software sample;
   dividing the representation of the executable code into sequences based on sequencing criteria;
   processing the sequences to form a symbol record for each sequence;
   processing the symbol record and adding the symbol record to a repository of malicious software code;
   determining common patterns between known malicious software samples of the repository based on frequently occurring symbol combinations; and
   directing storage of the common patterns as the predetermined set of malicious software patterns.

4. The method of claim 1, wherein determining whether the sample code is malicious software comprises determining a number of matching patterns between the sample code and the predetermined set of malicious software patterns and determining a likelihood that the sample code is malicious software based on the number.

5. The method of claim 1, wherein determining whether the sample code is malicious software further includes providing an output to a user in response to the sample code likely being malicious software.

6. The method of claim 1, wherein determining the malicious software cluster with which the sample code is associated further includes providing an output to a user indicating the malicious software cluster.

7. The method of claim 1, in which the operations of claim 1 are performed by at least one service configured accordingly as part of a method for facilitating access to at least one interface to allow access to at least one service via at least one network.

8. An apparatus comprising at least one processor and at least one memory including computer program code, the at least one memory and the computer program code configured to, with the at least one processor, cause the apparatus at least to:
  direct a comparison of patterns within sample code to a predetermined set of malicious software patterns,
  wherein the at least one memory and computer program code are configured to, with the at least one processor, cause the apparatus to determine the predetermined set of malicious software patterns by:
  determining common patterns between known malicious software samples based on frequently occurring symbol combinations; and
  filtering the common patterns based on patterns of known benign software samples to define the predetermined set of malicious software patterns;
  determine that the sample code is malicious software based on a number of patterns within the sample code that match patterns within the predetermined set of malicious software patterns; and
  subsequent to the determination that the sample code is malicious software, determine one or more clusters with which the sample code is associated,
  wherein the determination of the one or more clusters with which the sample code is associated with comprises:
  determine a first occurrence frequency, the first occurrence frequency being a number of distinct malicious software samples that match each malware code pattern within the sample code;
  determine a second occurrence frequency, the second occurrence frequency being a number of distinct malicious software samples that match each malware code pattern within a subset of the sample code;
  determine a first malicious software cluster with which the sample code is associated based on the first occurrence frequency,
  wherein the first malicious software cluster is comprised of one or more malicious software samples clustered based on a set of malicious code patterns to which the one or more malicious software samples matches;
  determine a second malicious software cluster with which the sample code is associated based on the difference between the first occurrence frequency and the second occurrence frequency being less than or equal to a predetermined parameter, wherein the second malicious software cluster is comprised of one or more malicious software samples clustered based on the set of malicious code patterns to which the one or more malicious software samples matches; and
  providing an output, in response to a request comprising the sample code, indicating that the sample code is malicious software.

9. The apparatus of claim 8, wherein the at least one memory and computer program code are further configured to, with the at least one processor, cause the apparatus to determine the predetermined set of malicious software patterns based on code patterns associated with a plurality of known malicious software samples.

10. The apparatus of claim 9, wherein the at least one memory and computer program code are configured to, with the at least one processor, cause the apparatus to determine the predetermined set of malicious software patterns by, for the plurality of known malicious software samples:
  producing a representation of executable code of a known malicious software sample;
  dividing the representation of the executable code into sequences based on sequencing criteria;
  processing the sequences to form a symbol record for each sequence;
  processing the symbol record and adding the symbol record to a repository of malicious software code;
  determining common patterns between known malicious software samples of the repository based on frequently occurring symbol combinations; and
  directing storage of the common patterns as the predetermined set of malicious software patterns.

11. The apparatus of claim 8, wherein the at least one memory and computer program code are configured to, with the at least one processor, cause the apparatus to determine whether the sample code is malicious software by determining a number of matching patterns between the sample code and the predetermined set of malicious software patterns and determining a likelihood that the sample code is malicious software based on the number.

12. The apparatus of claim 8, wherein the at least one memory and computer program code are configured to, with the at least one processor, cause the apparatus to determine the malicious software cluster with which the sample code is associated to further include providing an output to a user indicating the malicious software cluster.

13. The apparatus of claim 8, wherein the apparatus comprises a mobile terminal comprising user interface circuitry to facilitate user control of at least some functions of the apparatus.

14. A computer program product comprising at least one non-transitory computer-readable storage medium having computer-executable program code instructions stored therein, the computer-executable program code instructions comprising program code instructions for:
  directing a comparison of patterns within sample code to a predetermined set of malicious software patterns,
  wherein determining the predetermined set of malicious software patterns comprises:
    determining common patterns between known malicious software samples based on frequently occurring symbol combinations; and
  filtering the common patterns based on patterns of known benign software samples to define the predetermined set of malicious software patterns;
  determining that the sample code is malicious software based on a number of patterns within the sample code that match patterns within the predetermined set of malicious software patterns; and
  subsequent to the determination that the sample code is malicious software, determining one or more clusters with which the sample code is associated,
  wherein the determination of the one or more clusters with which the sample code is associated with comprises:
  determining a first occurrence frequency, the first occurrence frequency being a number of distinct malicious software samples that match each malware code pattern within the sample code;
  determining a second occurrence frequency, the second occurrence frequency being a number of distinct malicious software samples that match each malware code pattern within a subset of the sample code;

determining a first malicious software cluster with which the sample code is associated based on the first occurrence frequency, wherein the first malicious software cluster is comprised of one or more malicious software samples clustered based on a set of malicious code patterns to which the one or more malicious software samples matches;

determining a second malicious software cluster with which the sample code is associated based on the difference between the first occurrence frequency and the second occurrence frequency being less than or equal to a predetermined parameter, wherein the second malicious software cluster is comprised of one or more malicious software samples clustered based on the set of malicious code patterns to which the one or more malicious software samples matches; and providing an output, in response to a request comprising the sample code, indicating that the sample code is malicious software.

* * * * *